United States Patent Office 2,862,821
Patented Dec. 2, 1958

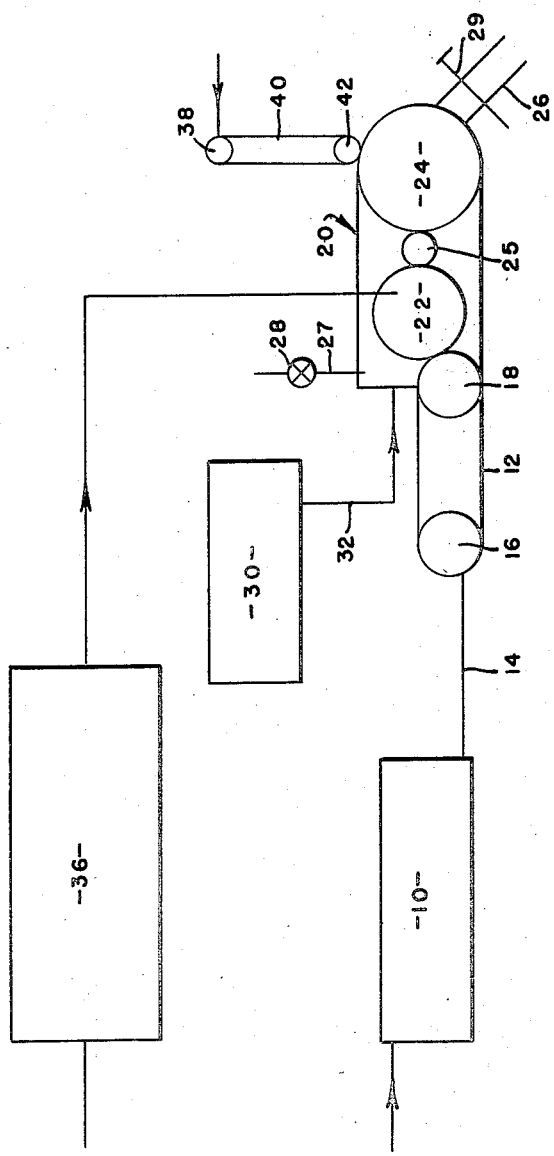

2,862,821

METHOD OF ASEPTICALLY CANNING FOOD PRODUCTS

Paul C. Wilbur, San Jose, and Robert A. Whitmore, Saratoga, Calif., assignors to Food Machinery and Chemical Corporation, San Jose, Calif., a corporation of Delaware Application June 22, 1954, Serial No. 438,390

8 Claims. (Cl. 99—182)

The present invention relates to those methods of preserving food products in sealed containers which are known as aseptic canning, and which involve sterilization of the food product outside of the containers, filling the sterile food product under aseptic conditions into pre-sterilized containers, and closing the product-filled containers with pre-sterilized lids in a sterile atmosphere.

According to known methods of aseptically canning food products, all canning operations, i. e., sterilizing the containers and their lids, filling the sterilized product into the sterilized containers, and closing the product-filled containers with the sterilized lids, are carried out in an atmosphere of saturated steam that is maintained at a sufficiently high temperature to render the atmosphere sterile. Owing to the necessity of having to maintain the saturated steam under super-atmospheric pressure so as to establish the required temperature, these methods must be carried out within enclosures that are completely sealed from the outside, which necessitates the use of heavy equipment and of complicated valves through which the containers are introduced into and pass out of the enclosures.

Other methods of aseptically canning food products seek to obviate these disadvantages by conducting the canning operations in an atmosphere of super-heated steam that is kept in a continuous state of flow through an enclosure that covers the canning equipment. In this manner the entrance of bacteria-laden air from the outside may be effectively prevented without need for valves of any kind. The disadvantage of these latter methods is that super-heated steam is not a dependable sterilizing agent unless heated to such high temperatures as may harmfully affect metal containers by softening their soldered seams or as may produce a prohibitively high incidence of breakage in the case of glass containers.

It is an object of the present invention to provide a dependable method of aseptically canning food products.

It is another object of the invention to provide a method of aseptically canning food products which involves no temperatures that are liable to harmfully affect metal or glass containers.

Another object is to provide a method of aseptically canning food products wherein the can filling and sealing operations need not be carried out in confined spaces that have to be closed off from the outside atmosphere by complicated valves.

Another object is to provide a method of aseptically canning food products at ordinary temperatures and pressures.

Another object is to provide a reliable method of aseptically preserving food products that is particularly applicable to glass containers.

Another object is to provide a reliable method of aseptically preserving food products in frangible containers in a manner adapted to keep breakage of the containers at a low level.

Another object is to provide a dependable method of aseptically canning food products in a manner permitting control of the degree of cooking of the food products after the containers have been sealed.

These and other objects of the present invention will become apparent from the following description and the accompanying drawing which illustrates diagrammatically the various stages of an aseptic method of preserving food products in glass containers which embodies the principles of the present invention.

The method of the invention comprises the steps of sterilizing the containers by the application of saturated steam, which is effective as a sterilizer without subjecting the containers to excessive heat, and then carrying out the remaining canning operations, i. e., the filling of the containers with the sterile product and the sealing of the product-filled containers with pre-sterilized lids in a constantly flowing atmosphere of a sterile gas, such as completely sterile air, at a temperature below the boiling point of water. Such an atmosphere prevents re-contamination of the containers, of the food product and of the lids as effectively as an atmosphere of highly super-heated steam but does not subject the containers to the excessive heat of such an atmosphere. The method of the present invention lends itself particularly well to the use of glass jars.

In the exemplary layout for the aseptic canning system illustrated in the accompanying drawing, the containers are first introduced into and washed in a water bath represented by the block 10. In the event that glass jars are used, the block 10 serves also as a tempering unit wherein the temperature of the jars is gradually raised to prepare them for the heat treatment in the sterilizing chamber 12 to which they are delivered from tempering unit 10 by a conveyor 14.

The maximum heat-shock which glass jars will successfully resist without an uneconomically high incidence of breakage is generally believed to be about 75° F. Therefore, in order to be able to subject the glass jars in the sterilizer to the highest possible sterilization temperature, the tempering unit 10 should be arranged to pre-heat the jars to a temperature close to the boiling point of water. Thus, the temperature at the inlet end of the tempering unit may be arranged to be about 105° F. and the temperature at its outlet end may be held at a temperature near the boiling point of water and the jars may be passed through unit 10 at such a rate that during the time of their passage through said unit their temperature is raised from room temperature to a temperature about equal to, or only a few degrees less than, the temperature of the water bath near the outlet end of the unit. The glass jars thus heated may therefore be subjected to a temperature as high as 285° F. or 290° F. in the sterilizing chamber 12 without danger of excessive breakage due to thermal shock.

As the conveyor 14 carries the washed and fore-warmed glass jars from the tempering unit 10 to the sterilizer 12, jets of steam may be blown into their interior by suitable nozzles (not shown) so as to sweep out any air contained therein and to maintain their temperature during the time of transport from unit 10 to sterilizer 12. For maximum effectiveness of the air sweeping operation and to avoid accumulation of condensation of water in the glass jars, the conveyor 14 should preferably be arranged to carry the jars in inverted, downwardly tilted or at least horizontal position.

The conveyor delivers the glass jars through a pressure valve 16 into the hereinbefore mentioned sterilization chamber 12 wherein they are sterilized by the application of saturated steam. As previously pointed out, the temperature of the saturated steam in the sterilizing chamber 12 should not be more than 75° F. above the jar temperature at the time the jars enter the sterilizer. Thus, if the temperature of the jars was, say, 200° F. or 210° F., as they traveled along conveyor 14, the temperature of the saturated steam atmosphere in sterilizing chamber 12 should be about 270° F. or 285° F. At this temperature the jars can be sterilized in less than 30 seconds. It is advisable to conduct the jars through the sterilizing chamber in an inverted or downwardly tilted position so that any condensates may constantly drain away. From the sterilizing chamber 12 the jars are passed through a pressure discharge valve 18 into an enclosure 20 within which are located the product filler 22, the jar closing machine 24 and a transfer turret 25 arranged to pass the product filled containers from the filling machine to the closing machine. From the enclosure 20 the sealed product filled containers are discharged through a discharge tunnel 26.

Prior to practical use of the described aseptic canning system the enclosure 20 and the mechanisms located thereunder must be carefully pre-sterilized. This may be accomplished by the application of saturated steam that is delivered into the enclosure through a pipeline 27 controlled by manually operable valve 28 while the discharge tunnel 26 is closed by means of a suitable slide gate 29. During practical operation of the described aseptic canning system the space within the enclosure 20 and the mechanisms located underneath are maintained in a thoroughly sterile condition by a stream of sterile gas, such as completely sterile air, that is continuously passed through said enclosure. Said stream of gas may be introduced into the enclosure 20 from a sterile gas system 30 through a suitable pipeline 32 and is discharged from said enclosure through the container discharge tunnel 26 from which the slide gate 29 has been withdrawn.

The necessary sterilization of the gas in the sterile gas system 30 may be accomplished in any suitable manner, such as by filters. It may also be accomplished by the application of heat, but as the sterile gas is passed through the enclosure 20, it should be at a temperature below the boiling point of water. When glass jars are used care must be taken that the temperature difference between the saturated steam atmosphere in the sterilizing chamber 12 and the sterile gas passing through the enclosure 20 is not greater than 75° F. to avoid excessive breakage of the glass jars due to thermal shock. Thus, if the temperature in the sterilizing chamber 12 is about 270° F., the temperature of the sterile gas passed through enclosure 20 should be below the boiling point of water but should not be lower than 195° F.

By performing the filling and sealing operations in a relatively cool atmosphere there is no danger that the soldered seams of metal containers may soften due to prolonged exposure to the sterilizing temperature; also, the lubrication of the product filling and container filling machines, which is difficult to maintain at high sterilizing temperatures, presents no problem, and over-cooking of the food product during the container filling and sealing operations is avoided.

The product filling machine 22 may be of conventional design since it is to operate at ordinary pressures and at a temperature below the boiling point of water, and the sterile product may be supplied to the filling machine from a product sterilizer 36 of conventional design that is represented by the block 36. When glass jars are used in the process of the invention, the temperature of the product when filled into the jars should not be more than about 75° F. below the temperature of the jars as they emerge from the sterilizer 12 so as to maintain breakage due to thermal-shock at a minimum. For example, if the temperature in the sterilizer is about 270° F., as mentioned hereinbefore, the temperature of the product as it is filled into the jars should not be less than 195° F. After the containers have been filled with the sterile product, the transfer turret 25 delivers them to the closing machine 24. The lids for the containers are passed from the outside through a valve 38 into a lid sterilizing chamber 40 where they may be sterilized in the conventional manner by saturated steam under pressure. Any convenient sterilizing temperature may be used for the sterilization of the lids in chamber 40 since they are usually made of tin plate and hence not subject to heat-shock. From chamber 40 the sterilized lids are passed through a pressure discharge valve 42 to the closing machine 24.

From the closing machine the closed containers are allowed to roll or slide by gravity through the hereinbefore mentioned discharge tunnel 26 to the outside atmosphere. For this purpose the discharge tunnel 26 may have the form of a downwardly inclined tube. By providing a gravity discharge of the containers from the enclosure 20, instead of an endless conveyor arrangement, no outside components enter the interior of the enclosure 20 during operation of the described canning system, and none of the components within the enclosure passes from the sterile atmosphere within to the bacteria-laden atmosphere outside and back into the enclosure. Hence there is no possibility for recontamination of the sterile atmosphere within the enclosure 20. To prevent effectively the entry of contaminating organisms through the tunnel 26 against the constant stream of sterile gas discharging through said tunnel, the overall width of said tunnel should be only slightly larger than the size of the processed containers, and its length should be at least one and one-half times the diameter of the container.

After discharge from the enclosure 20 the sealed containers, which are still at a temperature close to the boiling point of water, may be held long enough to cook their contents to the required degree before they are cooled. Thereafter they may be cooled by conventional means, such as an ordinary water-filled cooling tank (not shown).

While we have explained our invention with the aid of an exemplary embodiment thereof, it will be understood that we do not wish to be limited to the specific temperatures, sequence of operations and equipment described by way of example, which may be departed from without departing from the scope and spirit of our invention.

We claim:

1. The method of aseptically preserving a sterile food product in a container, which comprises subjecting the container to an enclosed atmosphere of saturated steam at a sterilizing temperature for a period of time sufficient to attain sterilization of the container, introducing the sterilized container into a confined pre-sterilized space maintained in sterile condition by the continuous flow therethrough of a sterile gas at a temperature below the boiling point of water and simultaneously blocking the flow of said sterile gas from said confined space toward said steam atmosphere, filling the container while in said confined sterile space with a sterile food product at a temperature below the boiling point of water, sealing the filled container with a pre-sterilized lid while in said confined sterile space, and discharging the sealed container from said confined sterile space by gravity with and along the discharge path of the sterile gas flowing through said confined space.

2. The method of aseptically preserving a sterile food product in a frangible vitreous container, which comprises subjecting the container to an enclosed atmosphere of saturated steam at a sterilizing temperature for a period of time sufficient to attain sterilization of the container, passing it after sterilization has been accomplished from said enclosed atmosphere of saturated steam into a confined pre-sterilized space maintained in sterile condition by the continuous flow therethrough of a sterile gas at a temperature less than about 75° F. below the temperature of said confined saturated steam atmosphere while simultaneously blocking the flow of said sterile gas from said confined space toward said steam atmosphere, filling the container while in said confined sterile space with a sterile food product at a temperature less than about 75° F. below the temperature in said enclosed saturated steam atmosphere, and sealing the filled container with a pre-sterilized lid while in said confined sterile space.

3. The method of aseptically preserving a sterile food product in a frangible vitreous container, which comprises preheating the container to a temperature near the boiling point of water, thereafter subjecting the container to an enclosed atmosphere of saturated steam at a sterilizing temperature less than about 75° F. above the boiling point for a period of time sufficient to attain sterilization of the container, passing it after sterilization has been accomplished from said enclosed atmosphere of saturated steam into a confined pre-sterilized space maintained in sterile condition by the continuous flow therethrough of a sterile gas at a temperature below the boiling point of water but less than about 75° F. below the temperature of said confined saturated steam atmosphere while simultaneously blocking the flow of said sterile gas from said confined space toward said steam atmosphere, filling the container while in said confined sterile space with a sterile food product at a temperature below the boiling point of water but less than about 75° F. below the temperature in said enclosed saturated steam atmosphere, sealing the filled container with a presterilized lid while in said confined sterile space and discharging the filled container from said confined sterile space by gravity with, and along the discharge path of, the sterile gas flowing through said space.

4. The method according to claim 3 wherein said sterile gas is pre-sterilized air.

5. The method of aseptically preserving a sterile food product in a frangible vitreous container, which comprises passing the container through a water bath having a temperature gradient of from about 100° F. to a temperature near the boiling point of water to heat it gradually to a point near said last mentioned temperature, thereafter subjecting the container in inverted condition to an enclosed atmosphere of saturated steam at a sterilizing temperature less than about 75° F. above the temperature at the terminal end of said water bath for a period of time sufficient to attain sterilization of the container, advancing the container after sterilization has been accomplished from said enclosed atmosphere of saturated steam into a confined pre-sterilized space maintained in sterile condition by the continuous flow therethrough of a sterile gas at a temperature below the boiling point of water but less than about 75° F. below the temperature of said enclosed saturated steam atmosphere while simultaneously blocking the flow of said sterile gas from said confined space toward said steam atmosphere, filling the container while in said sterile atmosphere with a sterile food product at a temperature below the boiling point of water but less than about 75° F. below the temperature in said enclosed saturated steam atmosphere, and sealing the filled container with a pre-sterilized lid while in said confined sterile space.

6. The method of aseptically preserving a sterile food product in a frangible vitreous container, which comprises passing the container through a water bath having a temperature gradient of from about 100° F. to a temperature near the boiling point of water to heat it gradually to a point near said last mentioned temperature, thereafter subjecting the container in inverted condition to an enclosed atmosphere of saturated steam at a sterilizing temperature less than about 75° above the temperature at the terminal end of said water bath for a period of time sufficient to attain sterilization of the container, advancing the container after sterilization has been accomplished from said enclosed atmosphere of saturated steam into a confined pre-sterilized space maintained in sterile condition by the continuous flow therethrough of a sterile gas at a temperature below the boiling point of water but less than about 75° F. below the temperature of said enclosed saturated steam atmosphere while simultaneously blocking the flow of said sterile gas from said confined space toward said steam atmosphere, filling the container while in said sterile atmosphere with a sterile food product at a temperature below the boiling point of water but less than about 75° F. below the temperature in said enclosed saturated steam atmosphere, sealing the filled container with the pre-sterilized lid while in said confined sterile space and discharging the sealed container from said confined space by gravity with and along the discharge path of the sterile gas flowing through said confined space.

7. The method according to claim 6 wherein said sterile gas is pre-sterilized air.

8. The method of aseptically preserving a sterile food product in a frangible vitreous container which comprises passing the container through a bath of water having a portion at a temperature near the boiling point of water to heat the container to a temperature of from 200° F. to 210° F., thereafter subjecting the container to an enclosed atmosphere of saturated steam at a temperature of from 270° F. to 285° F. but not greater than 75° F. higher than the temperature of the container entering said enclosed atmosphere for a period of time sufficient to attain sterilization of the container, advancing the container after sterilization has been accomplished from said enclosed atmosphere of steam into a confined pre-sterilized space maintained in sterile condition by the continuous flow therethrough of a sterile gas at a temperature in the range of 195° F. to 212° F. but not less than about 75° F. below the temperature of said steam atmosphere and simultaneously blocking the flow of said sterile gas from said confined space toward said steam atmosphere, filling the container while in said sterile atmosphere with a sterile food product at a temperature below the boiling point of water but less than about 75° F. below the temperature of said steam atmosphere, and sealing the filled container with a pre-sterilized lid.

References Cited in the file of this patent

UNITED STATES PATENTS

| | | |
|---|---|---|
| 2,424,049 | Parker et al. | July 15, 1947 |
| 2,549,216 | Martin | Apr. 17, 1951 |
| 2,639,991 | Ball | May 26, 1953 |

OTHER REFERENCES

Farmers Bulletin 1211, U. S. Dept. of Agriculture, pp. 18, 24, 25.